(12) United States Patent
Hayashi

(10) Patent No.: US 10,810,459 B2
(45) Date of Patent: Oct. 20, 2020

(54) INFORMATION PROCESSING APPARATUS AND CONTROL METHOD THAT VERIFY A CAPTURED IMAGE WITH A GENERATED REFERENCE IMAGE

(71) Applicant: CANON KABUSHIKI KAISHA, Tokyo (JP)

(72) Inventor: Kimio Hayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 15/943,053

(22) Filed: Apr. 2, 2018

(65) Prior Publication Data

US 2018/0285688 A1 Oct. 4, 2018

(30) Foreign Application Priority Data

Apr. 4, 2017 (JP) .................. 2017-074493

(51) Int. Cl.
| | | |
|---|---|---|
| *G06K 9/62* | (2006.01) | |
| *G06T 3/60* | (2006.01) | |
| *G06K 9/00* | (2006.01) | |
| *G06T 7/73* | (2017.01) | |
| *G06T 7/11* | (2017.01) | |

(Continued)

(52) U.S. Cl.
CPC ....... *G06K 9/6255* (2013.01); *G06K 9/00456* (2013.01); *G06K 9/6257* (2013.01); *G06T 3/60* (2013.01); *G06T 7/001* (2013.01); *G06T 7/11* (2017.01); *G06T 7/74* (2017.01); *H04N 1/00204* (2013.01); *H04N 1/233* (2013.01); *H04N 1/2323* (2013.01); *H04N 1/2384* (2013.01); *H04N 1/387* (2013.01); *H04N 1/3873* (2013.01); *G06K 2209/01* (2013.01); *G06T 2207/30144* (2013.01); *G06T 2207/30176* (2013.01); *H04N 2201/0039* (2013.01); *H04N 2201/0094* (2013.01)

(58) Field of Classification Search
CPC .......... G06K 2209/01; G06K 9/00456; G06K 9/6255; G06K 9/6257; G06T 2207/30144; G06T 2207/30176; G06T 3/60; G06T 7/001; G06T 7/11; G06T 7/74; H04N 1/00204; H04N 1/2323; H04N 1/233; H04N 1/2384; H04N 1/387; H04N 1/3873; H04N 2201/0039; H04N 2201/0094
See application file for complete search history.

(56) References Cited

U.S. PATENT DOCUMENTS

2002/0087338 A1\* 7/2002 Haydt, III ............ G06Q 10/083
   705/337
2020/0009617 A1\* 1/2020 Delfer ...................... B07C 3/18

FOREIGN PATENT DOCUMENTS

JP 2010-178028 A 8/2010

\* cited by examiner

*Primary Examiner* — Nirav G Patel
(74) *Attorney, Agent, or Firm* — Venable LLP

(57) ABSTRACT

An information processing apparatus includes a generating unit configured to generate a reference image based on an image of a first object, an image of a second object, and processing information on processes including a process of inserting a second object into the first object. The first object has at least one window portion through which the inserted second object is at least partially visible, a verifying unit configured to verify a captured image with the generated reference image, the captured image being obtained by capturing the first object into which the second object has been inserted, and an outputting unit configured to output a result of the verification.

17 Claims, 9 Drawing Sheets

(51) Int. Cl.
*G06T 7/00* (2017.01)
*H04N 1/387* (2006.01)
*H04N 1/23* (2006.01)
*H04N 1/00* (2006.01)

| ITEM | VALUE |
| --- | --- |
| ORDER NUMBER | 21467192 |
| PRODUCT TYPE | ENVELOPE |
| IMAGE DATA (TYPE="ENVELOPE") | ../data/envelope.jpg |
| IMAGE DATA (TYPE="TO-BE-INSERTED SHEET") | ../data/body.jpg |
| POSTPRESS PROCESSING INFORMATION | |
| SHEET FOLDING INSTRUCTION | Z-FOLD |
| CUTTING INSTRUCTION | TOP-BOTTOM 5 mm, LEFT-RIGHT 2 mm |
| SIZE OF WINDOW OF ENVELOPE | 40×78mm |
| POSITION OF WINDOW OF ENVELOPE | (X:40、Y:78.3) |
| POSITION OF INFORMATION TO BE PRESENTED WITHIN WINDOW OF ENVELOPE | - SECOND PAGE<br>- (X:100、Y:400) |
| FINISHED SIZE OF ENVELOPE | 120×235mm<br>(ELONGATED TYPE 3) |
| FINISHED SIZE OF TO-BE-INSERTED SHEET | B6<br>(FOLDED AND INSERTED IN ONE DIRECTION) |

FIG.4

INFORMATION PROCESSING APPARATUS AND CONTROL METHOD THAT VERIFY A CAPTURED IMAGE WITH A GENERATED REFERENCE IMAGE

BACKGROUND OF THE INVENTION

This application claims the benefit of Japanese Patent Application No. 2017-074493, filed Apr. 4, 2017, which is hereby incorporated by reference herein in their entirety.

FIELD OF THE INVENTION

The present invention relates to a technique of verifying a given image with an image of an object subjected to processing.

DESCRIPTION OF THE RELATED ART

A shipping check on a printed product using images has heretofore been performed. In this shipping check, a captured image obtained by capturing an image of a printed product is automatically verified with a pre-registered image that is used for the printing.

In commercial printing, various printed products are produced by combining an image forming apparatus and one or more postpress processing apparatus. In an example, a sheet printed by an image forming apparatus is subjected to a cutting process, a folding process, and so on, executed by one or more postpress processing apparatus to produce a to-be-inserted sheet that is the cut and folded sheet to be inserted into an envelope. Further, a process of inserting the to-be-inserted sheet after these processes into the envelope is performed by other postpress processing apparatus. These processes subsequent to the printing process will be collectively referred to as "postpress processes".

Here, in a case when the envelope in which to insert the to-be-inserted sheet is a windowed envelope, the shipping check will not be performed properly if the process of verifying a captured image is performed using an image obtained by simply combining an image of the envelope and an image of the to-be-inserted sheet. This is because the to-be-inserted sheet is subjected to the folding process, the cutting process, the inserting process, and so on, and information to be visible through the window changes depending on these processes.

Japanese Patent Laid-Open No. 2010-178028 discloses a technique in which the position of folding of a to-be-inserted sheet and the amount of cutting of the to-be-inserted sheet in postpress processes are determined with the size of its envelope taken into consideration, and also the layout of printing of the to-be-inserted sheet is determined with the position of the window of the envelope taken into consideration. By using the technique of Japanese Patent Laid-Open No. 2010-178028, it is possible to print address information on the to-be-inserted sheet to be actually visible through the window of the envelope.

The technique described in Japanese Patent Laid-Open No. 2010-178028 discloses the determining process of the printing layout of the sheet to be inserted into the windowed envelope, but does not discloses the automatic verification process for the shipping check on the printed product.

SUMMARY OF THE INVENTION

An information processing apparatus according to an aspect of the present invention includes a generating unit configured to generate a reference image based on processing information on processing including a process of inserting a second object into a first object configured such that the second object inserted therein is at least partially visible, and based on an image of the first object and an image of the second object, a verifying unit configured to verify a captured image with the reference image, the captured image being obtained by capturing an image of the first object with the second object inserted therein, and an outputting unit configured to output a result of the verification.

Further features of the present invention will become apparent from the following description of exemplary embodiments with reference to the attached drawings.

BRIEF DESCRIPTION OF THE DRAWINGS

FIG. 4 is a diagram illustrating an example of order information;

DESCRIPTION OF THE EMBODIMENTS

A preferred embodiment of the present invention will now be exemplarily described in detail with reference to accompanying drawings. Note that the components, and the like, described in this embodiment are merely exemplary, and the scope of the invention is not intended to be limited solely to those.

In the following, a mode will be exemplarily described in which a second object is inserted into a first object. The first object is configured such that an object inserted therein is at least partially visible. Specifically, the first object is a windowed envelope, and the second object is a to-be inserted sheet.

<Example of Configuration of Information Processing System>

Figure 1:
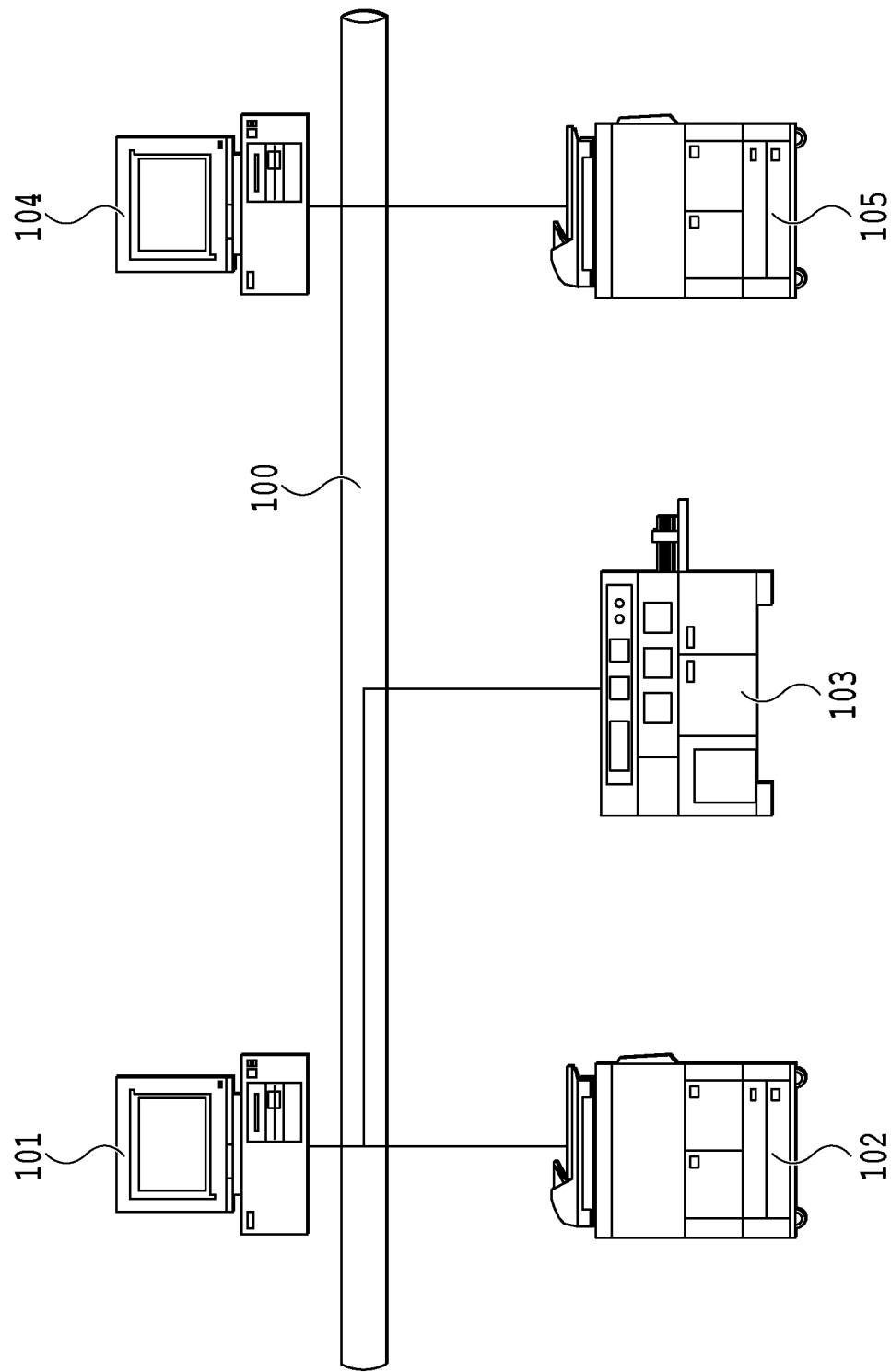
FIG. 1 is a system configuration diagram of an information processing system.

FIG. 1 is a diagram illustrating an example of the overall configuration of an information processing system according to this embodiment. Note that the overall configuration of the information processing system in the following description is intended to facilitate the understanding of the description and is not limited to the illustrated configuration.

In FIG. 1, the information processing system includes an information processing apparatus 101, an image forming apparatus 102, at least one postpress processing apparatus 103, an information processing apparatus 104, and an image forming apparatus 105. Each apparatus is connected to a network 100.

The information processing apparatus 101 is configured as a computer, or the like, that performs various types of information processing. The information processing apparatus 101 executes a job managing program for managing the production of printed products performed in the image forming apparatus 102 as well as various programs that operate as a web server. The information processing apparatus 101 is connected to the image forming apparatus 102 and the postpress processing apparatus 103 through the network 100. In the information processing apparatus 101 are installed a printer driver program, and the like, for controlling the image forming apparatus 102 and the postpress processing apparatus 103. The information processing apparatus 101 transmits print data for printing a print object to the image forming apparatus 102. The information processing apparatus 101 transmits order information and image data on the print object contained in the print data transmitted to the image forming apparatus 102, to the information processing apparatus 104. The order information contains, for example, the product type of the print object (e.g. an envelope), information specifying the image data on the print object (e.g., information on the location where the image data is stored), and information on the postpress process. The image data on the print object is used in a verifying process for a shipping check at the information processing apparatus 104. Details will be described later. The information processing apparatus 101 also transmits the information on the postpress process (e.g., a sheet folding instruction) to the postpress processing apparatus 103.

The image forming apparatus 102 is a printing apparatus that analyzes the print data transmitted from the information processing apparatus 101, converts the print data into a dot image on a page-by-page basis, and prints it. The printed product outputted from the image forming apparatus 102 is transferred to the postpress processing apparatus 103 manually by a printing operator, or transferred to the postpress processing apparatus 103 by means of a belt conveyor (not illustrated).

The postpress processing apparatus 103 is an apparatus that can communicate with the image forming apparatus 102 and the information processing apparatus 101 through the network 100. The postpress processing apparatus 103 can perform postpress processes such as cutting, orientation of the envelope and the to-be-inserted sheet, folding, insertion, and sealing. An instruction of a postpress process, such as folding, is transmitted from the information processing apparatus 101 through the network 100. The postpress processing apparatus 103 may not be physically connected to the image forming apparatus 102.

The information processing apparatus 104 is configured as a computer, or the like, that performs various types of information processing. The information processing apparatus 104 executes various programs such as an image verifying program utilized in the shipping check. Details of an image verifying process based on the image verifying program will be described later. In the information processing apparatus 104, a printer driver program, and the like, for passing print data to the image forming apparatus 105 are installed. If the result of the image verifying process is such that the check is passed, the information processing apparatus 104 creates print data on a delivery slip based on the order information, and transmits this print data to the image forming apparatus 105.

The image forming apparatus 105 analyzes print data, including the print data transmitted from the information processing apparatus 104, converts the print data into a dot image on a page-by-page basis, and prints it. Consequently, the delivery slip is printed.

The information processing system illustrated in FIG. 1 represents an example where there are provided one information processing apparatus 101, one image forming apparatus 102, one postpress processing apparatus 103, one information processing apparatus 104, and one image forming apparatus 105. However, a plurality of these apparatuses may be provided. The information processing apparatus 104 may not be provided. Instead, the programs executed by the information processing apparatus 104 may be installed in the information processing apparatus 101. The network 100 may be the Internet, and the configuration may be such that, for example, the image forming apparatus 102, the postpress processing apparatus 103, and the image forming apparatus 105 are accessed from the information processing apparatus 101 through the Internet.

<Example of Hardware Configuration of Information Processing Apparatus 104>

Figure 2:
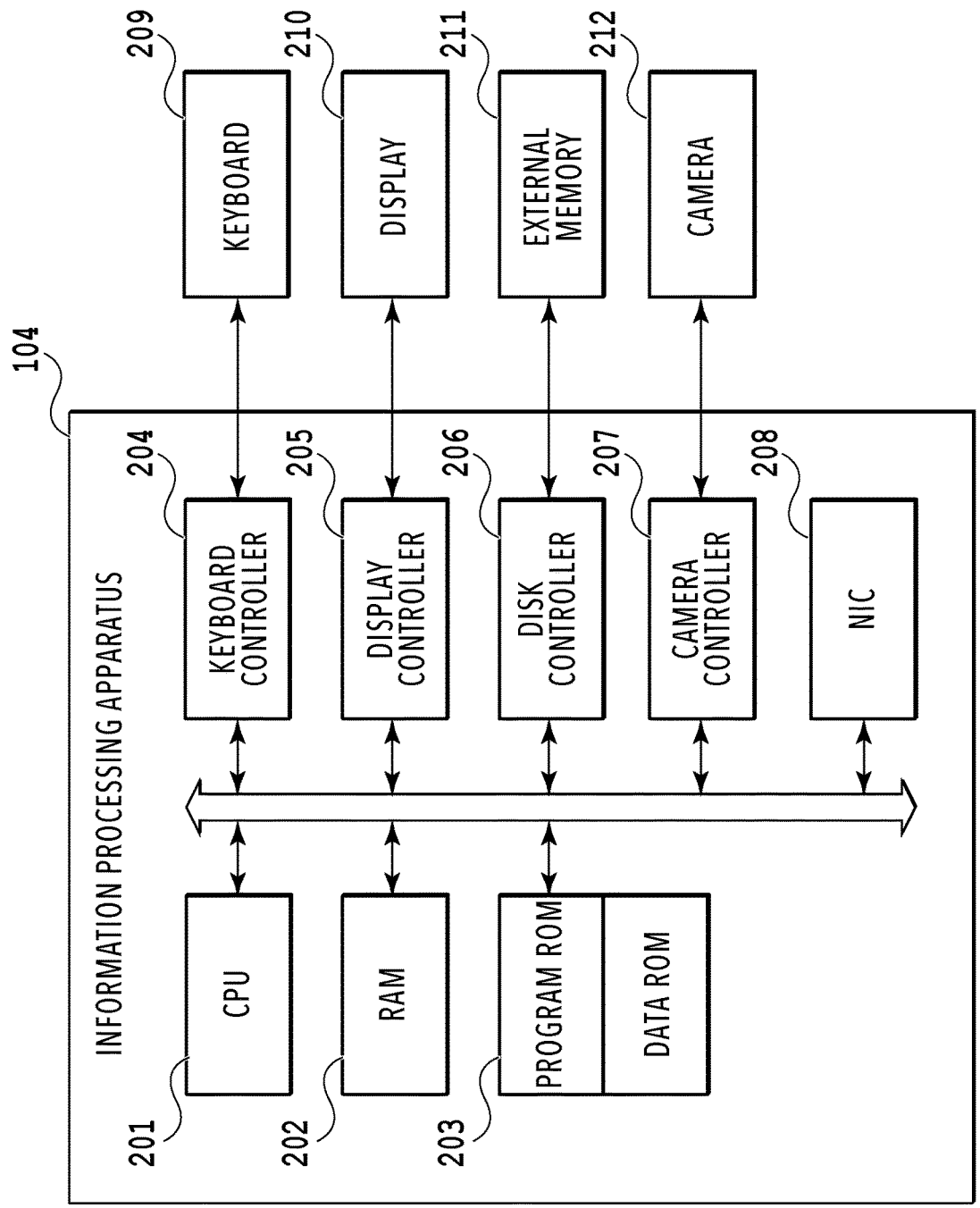
FIG. 2 is a block diagram illustrating the hardware configuration of the information processing system.

FIG. 2 is a diagram illustrating an example of the hardware configuration of the information processing apparatus 104 in this embodiment. The information processing apparatus 104 can be configured using the hardware of a typical computer (PC: Personal Computer). The information processing apparatus 104 includes a central processing unit (CPU) 201, a random access memory (RAM) 202, and a read only memory (ROM) 303. The information processing apparatus 104 includes a keyboard controller 204, a display controller 205, a disk controller 206, a camera controller 207, and a network interface card (NIC) 208.

The CPU 201 executes programs such as programs stored in a program ROM within the ROM 203, an operating system (OS) and application programs loaded to the RAM 202 from an external memory 211. Specifically, the CPU 201 functions as each unit in FIG. 3 to be described later by executing programs stored in a readable storage medium.

The RAM 202 is the main memory for the CPU 201 and functions as a work area, or the like. The keyboard controller 204 controls operation inputs from a keyboard 209, a barcode reader (not illustrated), and pointing devices not illustrated (such as a mouse, a touchpad, a touchscreen, and a trackball). The display controller 205 controls display on a display 210. The disk controller 206 controls access to data in the external memory 211, such as a hard disk drive or a flexible disk storing various pieces of data. The camera controller 207 controls input of captured image data captured by a camera 212. The NIC 208 is connected to the network 100 and executes a process of controlling communication with the other apparatuses connected to the network.

Meanwhile, the information processing apparatus 104 may include the keyboard 209, the display 210, the external memory 211, and the camera 212, or include some of these.

<Example of Software Configuration of Information Processing Apparatus 104>

Figure 3:
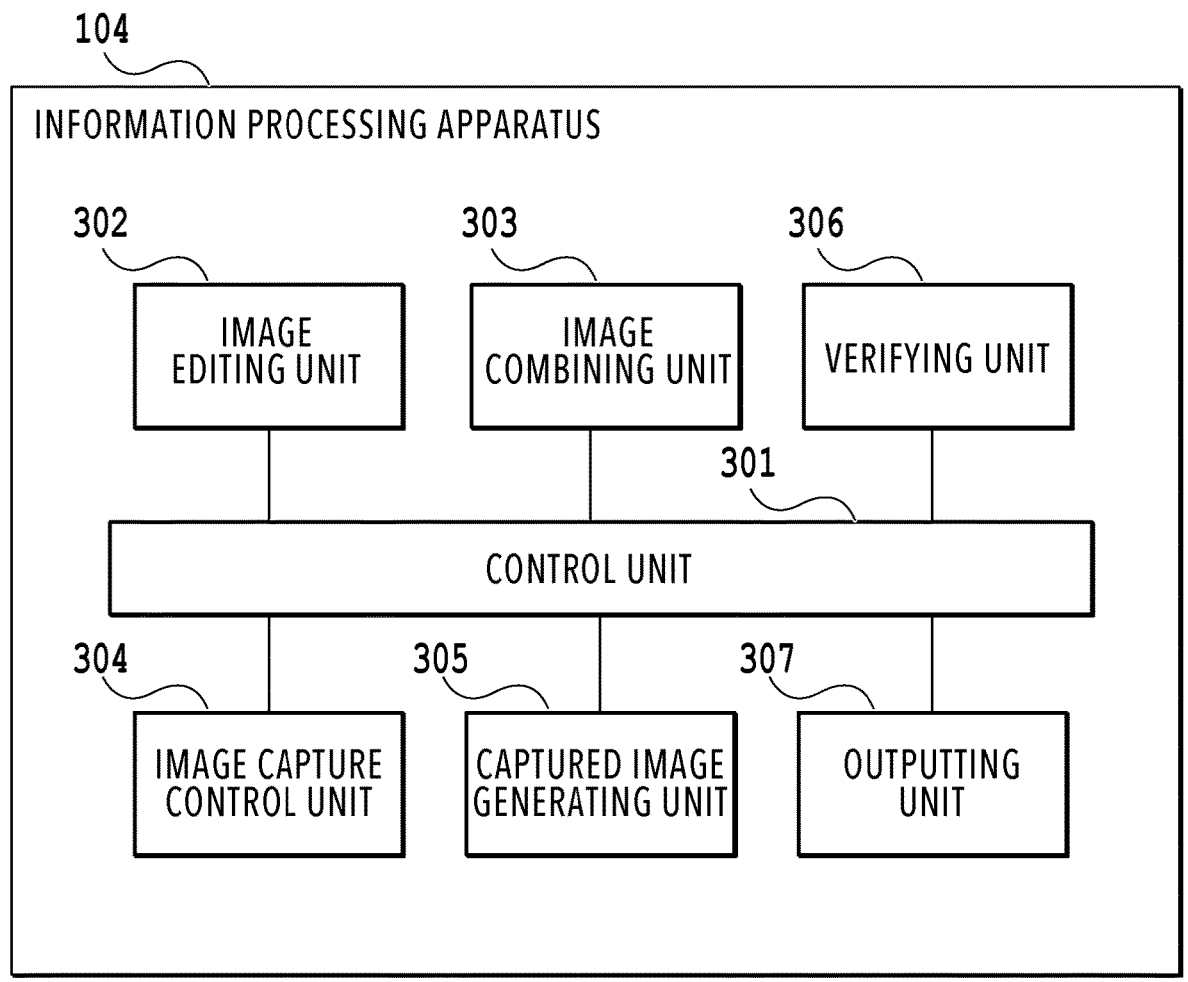
FIG. 3 is a block diagram illustrating the software configuration of the information processing system.

FIG. 3 is a block diagram illustrating functions of the information processing apparatus 104 in this embodiment. The information processing apparatus 104 includes a control unit 301, an image editing unit 302, an image combining unit 303, an image capture control unit 304, a captured image generating unit 305, a verifying unit 306, and an outputting unit 307. As mentioned earlier, the CPU 201 functions as the units illustrated in FIG. 3 by reading programs stored in a readable storage medium, such as the ROM 203 onto the RAM 202, and executing them.

The control unit 301 controls the implementation of the units 302 to 307 of the information processing apparatus 104.

The image editing unit 302 obtains the order information transmitted from the information processing apparatus 101 and the data of an image of the second object (to-be-inserted sheet). The image editing unit 302 edits the image of the to-be-inserted sheet based on processing information (hereinafter referred to as the postpress process information)

contained in the order information. Specifically, the image editing unit 302 generates a finished image of the to-be-inserted sheet, which is to be used in the combination with an image of the first object (windowed envelope).

FIG. 4 is a diagram illustrating an example of order information 400 in this embodiment. The order information contains an order number identifying the order, the product type, information specifying the image data on the first object, information specifying the image data on the second object, and postpress process information. The first object is an object configured such that an object inserted therein is at least partially visible. In this embodiment, the first object is a windowed envelope. The second object is an object to be subjected to processing including a process of inserting it into the first object. In this embodiment, the second object is a to-be-inserted sheet. In other words, the order information 400 contains information specifying image data on the envelope and information specifying image data on the to-be-inserted sheet. Meanwhile, as the example of FIG. 4, the mode has been exemplarily described in which path information containing information on the location where the image data is stored is contained as the value of the information specifying the image data. However, the present invention is not limited to this example. The image data itself may be contained in the order information 400.

The postpress process information is information on, for example, sheet folding and cutting instructions, the size of the window of the envelope, the position of the window of the envelope, the position of information to be presented within the window of the envelope, the finished size of the envelope, and the finished size of the to-be-inserted sheet. The position of the window of the envelope indicates a coordinate position of the window in the envelope image (the top left coordinates in a plan view). The region of the window in the envelope image is specified based on the coordinate position of the window and the size of the window. The position of the information to be presented within the window of the envelope indicates a coordinate position in the image of the to-be-inserted sheet (the top left coordinates in a plan view). The region in the to-be-inserted sheet image corresponding to the window of the envelope is specified based on the position of the information to be presented within the window and the size of the window. The postpress process information may contain information other than the sheet folding and cutting instructions such as glue application and scoring instructions.

The description will be continued referring back to FIG. 3. The image combining unit 303 generates a combined image by combining the image of the second object generated by the image editing unit 302 (the finished image of the to-be-inserted sheet) and the image of the first object transmitted from the information processing apparatus 101 (the image of the envelope). The image combining unit 303 obtains the direction of sheet conveyance in the postpress processing apparatus 103. If the front and rear sides of the envelope and the front and rear sides of the to-be-inserted sheet will be oriented opposite from each other in the postpress processing apparatus 103, the image combining unit 303 rotates the finished image of the to-be-inserted sheet and combines the rotated image and the image of the envelope. Combining the images with the direction of conveyance taken into consideration can prevent a wrong verification result from being derived.

The image capture control unit 304 controls the starting and stopping of image capture of an object using the camera 212. The object whose image is to be captured is the first object (envelope) with the second object (to-be-inserted sheet) inserted therein. In other words, it is an object in a state where characters, and the like, printed on the to-be-inserted sheet are visible through the window portion of the envelope.

The captured image generating unit 305 obtains captured image data captured by the control by the image capture control unit 304, and generates a captured image. Note that the captured image generating unit 305 may generate the captured image in the RAM 202 as image data. Also, the captured image generating unit 305 may generate the captured image in a file format such Bitmap or JPEG.

The verifying unit 306 performs a process of verifying the captured image generated by the captured image generating unit 305 with images registered in advance (hereafter referred to as "reference images") to determine whether or not the captured image and any of the reference images match. In a case when the product type contained in the order information 400 is an envelope, the verifying unit 306 performs a verifying process to verify the captured image with the combined image generated by the image combining unit 303. In this verifying process, the verifying unit 306 obtains the finished size of the envelope and the finished size of the to-be-inserted sheet contained in the order information 400, and calculates the difference therebetween. The verifying unit 306 then generates images of allowable patterns in which the difference is taken into consideration. These allowable pattern images thus generated are also used as reference images. In other words, the verifying unit 306 also performs a process of verifying the captured image with the allowable pattern images. By verifying the captured image with the allowable pattern images as described above, the verification result is determined as a pass as long as the captured image matches any of the allowable pattern images even if the captured image does not match the combined image due to displacement of the to-be-inserted sheet inside the envelope.

As the example illustrated in FIG. 3, discussed above, the configuration in which the information processing apparatus 104 includes the above units has been exemplarily described. However, the present invention is not limited to such a mode. The processes by the units illustrated in FIG. 3 may be distributed to and performed by a plurality of apparatuses. For example, the processes by the image editing unit 302 and the image combining unit 303 may be executed by a first image processing apparatus (not illustrated), and the process by the verifying unit 306 may be executed by a second image processing apparatus (not illustrated). Besides this example, any of the processes illustrated in FIG. 3 may be executed by a different apparatus.

<Schematic Diagram of Image Combining Process>

Figure 5:
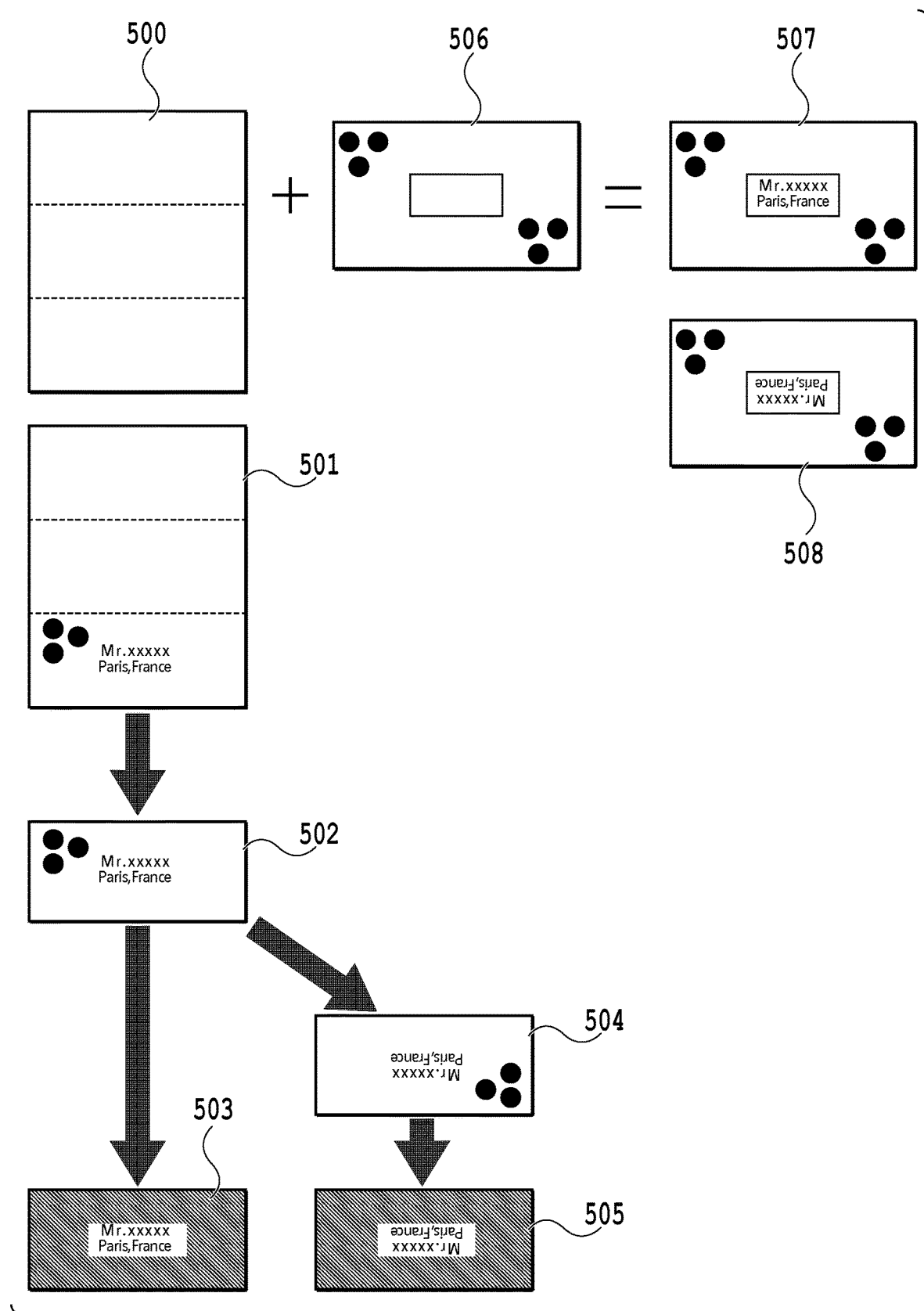
FIG. 5 is a schematic diagram of an image editing process and an image combining process.

FIG. 5 is a schematic diagram for explaining the image editing process and the image combining process in this embodiment. FIG. 5 illustrates to-be-inserted sheet images 500 to 505 and an envelope image 506. FIG. 5 also illustrates combined images 507 and 508 obtained as a result of the image combining process.

The to-be-inserted sheet image 500 and the to-be-inserted sheet image 501 are images transmitted from the information processing apparatus 101. Specifically, they are the very images transmitted from the information processing apparatus 101 to the image forming apparatus 102 and to be printed onto a to-be-inserted sheet in the image forming apparatus 102. Images converted from print data are transmitted from the information processing apparatus 101 to the information processing apparatus 104. Note that the print data is to be printed on both sides in this embodiment. In this case, the to-be-inserted sheet image 500 will be the first page of the print data (the front side of the printed product) while the to-be-inserted sheet image 501 will be the second page of the print data (the back side of the printed product). Referring to the order information 400, the order information 400 for these to-be-inserted sheet images 500 and 501 indicates a "Z-fold" as the sheet folding instruction. Thus, fold lines are also indicated on the to-be-inserted sheet images 500 and 501. Moreover, the information to be visible through the window of the envelope is printed on a lower portion of the to-be-inserted sheet image 501.

The image editing unit 302 edits an image in which the information to be visible through the window of the envelope is present. In other words, the image editing unit 302 edits the to-be-inserted sheet image 501 to generate an edited image. The to-be-inserted sheet image 501 is edited by the image editing unit 302 into a finished image (edited image) 502 of the to-be-inserted sheet. The finished image 502 of the to-be-inserted sheet is a view illustrating an image of the surface of the processed to-be-inserted sheet on which the information to be visible through the window of the envelope is present. The image editing unit 302 masks the finished image 502 based on the size of the window of the envelope and the position of the information to be presented within the window of the envelope contained in the postpress process information, to thereby generate a to-be-combined image (edited image) 503.

Note that the image editing unit 302 rotates the finished image 502 depending on the direction of conveyance of the to-be-inserted sheet relative to the envelope in the postpress processing apparatus 103. Specifically, if the front and rear sides of the to-be-inserted sheet in the direction of conveyance thereof are to be reversed relative to the envelope, the image editing unit 302 rotates the finished image 502 by one hundred eighty degrees to edit it into a finished image 504. Then, the image editing unit 302 masks the finished image 504 based on the size of the window of the envelope and the position of the information to be presented within the window of the envelope contained in the postpress process information, to thereby generate a to-be-combined image 505.

The to-be-combined image 503 thus generated is combined with the envelope image 506 by the image combining unit 303, so that a combined image 507 is generated. Alternatively, the to-be-combined image 505 thus generated is combined with the envelope image 506 by the image combining unit 303, so that a combined image 508 is generated.

<Schematic Diagram of Image Verifying Process>

Figure 6:
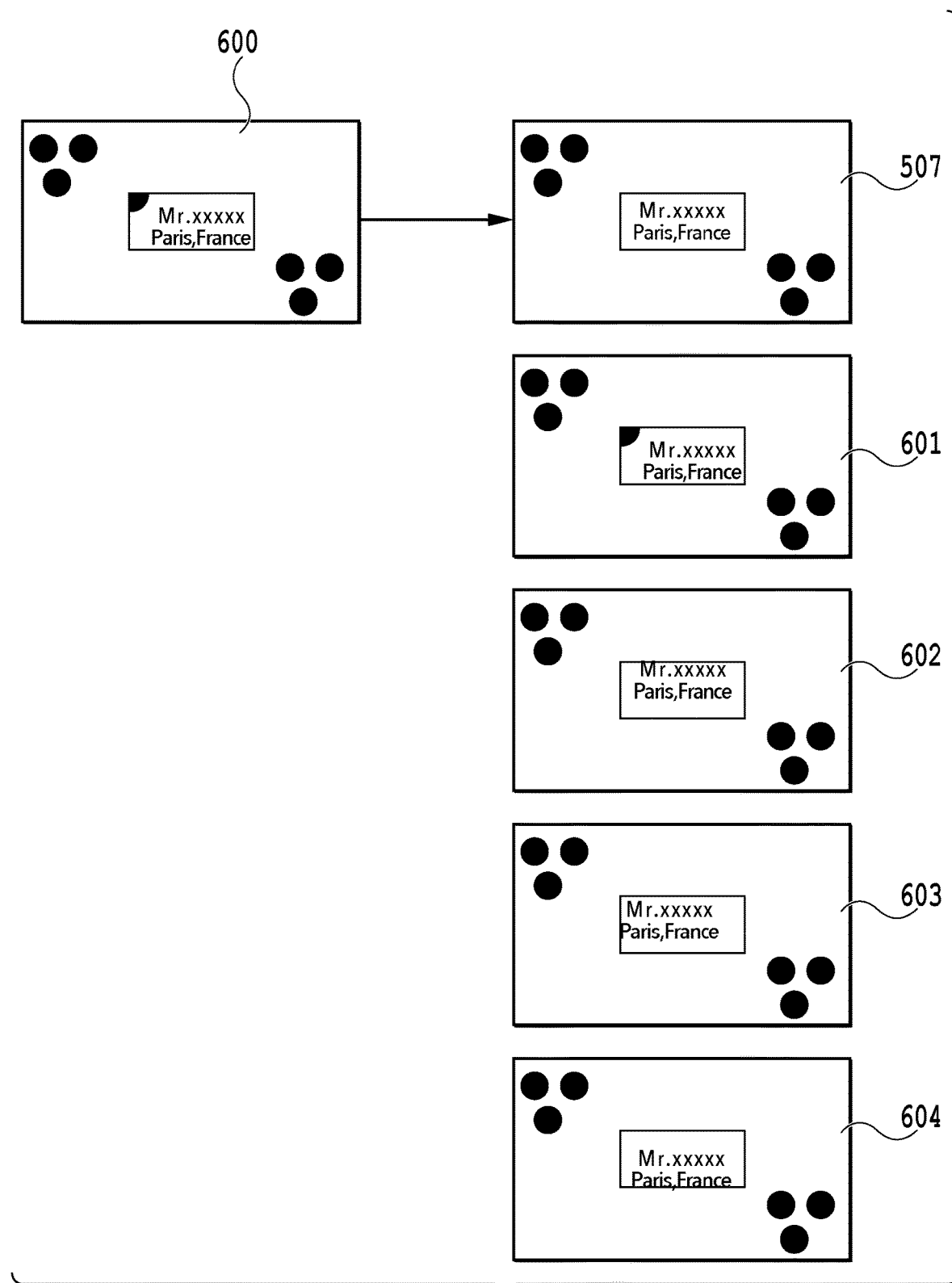
FIG. 6 is a schematic diagram of an image verifying process.

FIG. 6 is a schematic diagram for explaining the image verifying process in this embodiment. FIG. 6 illustrates a captured image 600, the combined image 507, and allowable pattern images 601 to 604. The captured image 600 is a captured image captured by the camera 212 and generated by the captured image generating unit 305. The combined image 507 is an image generated by the image combining unit 303. The images 601 to 604 are images indicating allowable patterns for the check to be performed on the combined image 507. The allowable-pattern indicating images 601 to 604 are generated by the verifying unit 306 based on the envelope image 506 and the finished image 502, which constitute the combined image 507, and the finished size of the envelope and the finished size of the to-be-inserted sheet contained in the order information 400. Specifically, the verifying unit 306 subtracts the finished size of the to-be-inserted sheet from the finished size of the envelope to calculate the difference therebetween. This difference represents the largest amount of displacement of the to-be-inserted sheet that can occur after the to-be-inserted sheet is inserted and sealed in the envelope. In other words, the to-be-inserted sheet may possibly be displaced inside the envelope within the range of this amount of displacement. Then, the allowable-pattern indicating images 601 to 604 are generated with this amount of displacement taken into consideration. The combined image 507 and the allowable-pattern indicating images 601 to 604 can each be an image to be used in the verifying process, that is, a reference image.

In the image verifying process, the verifying unit 306 verifies the captured image 600 with the reference images and determines whether or not the captured image 600 and any of the reference images match. Specifically, the verifying unit 306 verifies the captured image 600 with the combined image 507 and determines whether or not they match. The verifying unit 306 also verifies the captured image 600 with the allowable pattern images 601 to 604 and determines whether or not the captured image 600 and any of the allowable pattern images 601 to 604 match. Thus, even if the captured image 600 does not match the combined image 507, the verifying unit 306 determines that the verification is passed, that is, the shipping check is passed, as long as the captured image 600 matches any of the allowable pattern images 601 to 604. In the example illustrated in FIG. 6, the captured image 600 matches the allowable pattern image 601 and the verifying unit 306 therefore determines that the check is passed.

Next, an example of the verifying process will be described. The verifying unit 306 identifies character regions in the captured image and character regions in each reference image. For example, the verifying unit 306 performs a process of identifying the character regions by using an existing character recognition library. The verifying unit 306 then extracts the characters in the identified character regions by, for example, performing a character recognition process (optical character recognition (OCR) process). The verifying unit 306 then compares the extracted characters to determine whether or not they match. Alternatively, the verifying unit 306 may extract geometrical features (e.g., edges) from the images and identify character regions with the highest degree of match in terms of the geometrical features. The verifying unit 306 may then compare amounts of characteristic at characteristic points to determine whether or not they match. Note that the verifying process is not limited to the above, but may be performed using any method.

<Flowchart of Image Editing Process and Image Combining Process>

Figure 7:
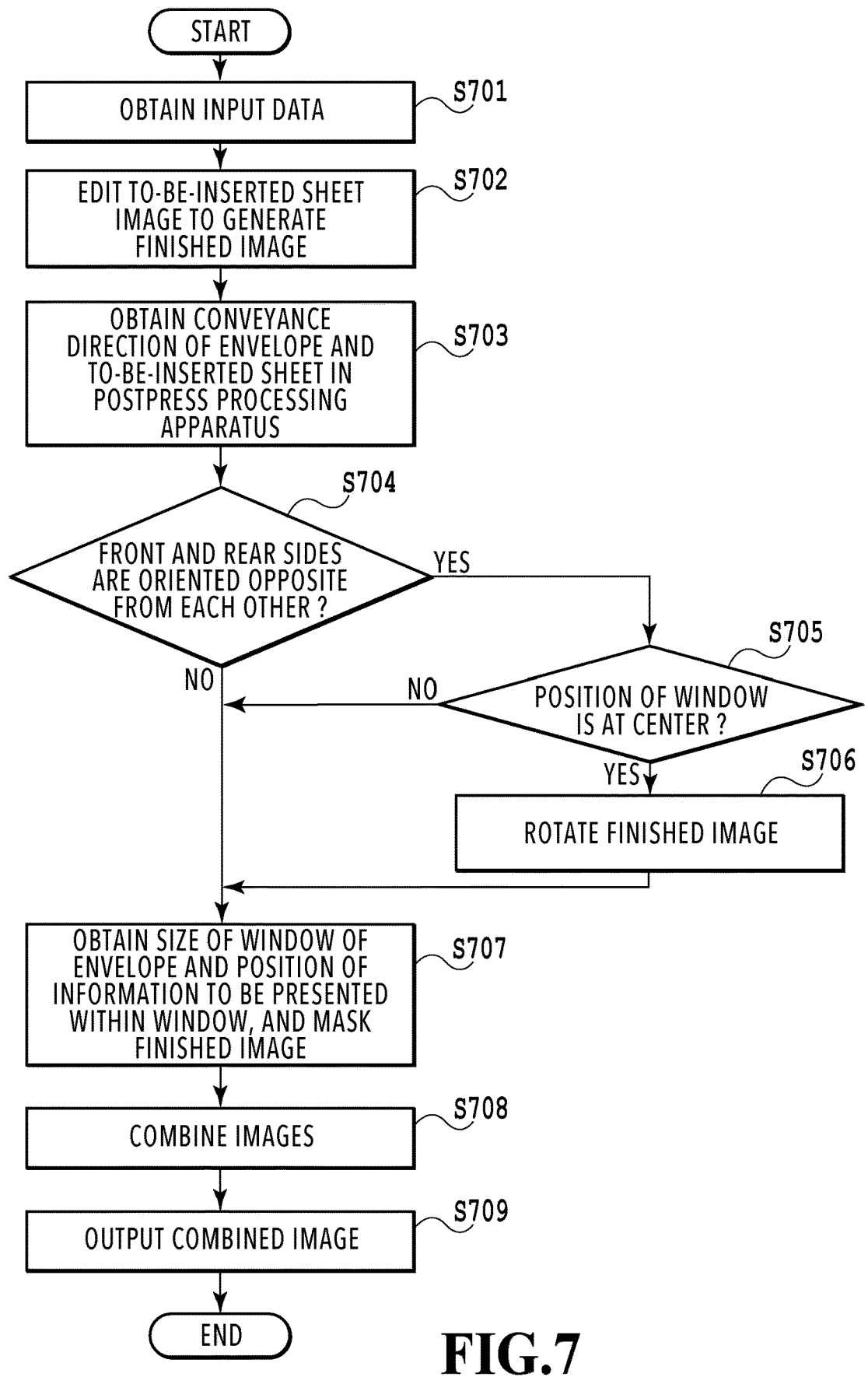
FIG. 7 is a flowchart of the image editing process and the image combining process.

FIG. 7 is a flowchart of the image editing process and the image combining process in this embodiment. The program for each of the procedures is stored in the ROM 203 of the information processing apparatus 104 or in the external memory 211, read into the RAM 202, and executed by the CPU 201. The procedures will be described below with reference to the images illustrated in FIG. 5.

In step S701, the image editing unit 302 obtains input data. The input data to be obtained is order information containing postpress process information and the data of images used in printing. Specifically, it is the order information 400, the data of the envelope image 506, the to-be-inserted sheet image 500, and the to-be-inserted sheet image 501.

In step S702, the image editing unit 302 edits the to-be-inserted sheet image 501 by following the sheet folding and cutting instructions specified in the postpress process information contained in the order information. Specifically, the image editing unit 302 cuts and/or folds the to-be-inserted sheet image 501 into an image of a surface including the information to be presented within the window of the envelope. In the example of FIG. 5, the image editing unit 302 folds the to-be-inserted sheet image 501. Consequently, the image editing unit 302 generates the finished image 502.

In step S703, the image editing unit 302 obtains the direction of conveyance of each of the envelope and the to-be-inserted sheet in the postpress processing apparatus 103.

In step S704, the image editing unit 302 determines, based on the directions of conveyance obtained in step S703, whether or not the front and rear sides of the envelope and the front and rear sides of the to-be-inserted sheet are oriented opposite from each other. If their front and rear sides are oriented opposite from each other, the image editing unit 302 proceeds to step S705. If their front and rear sides are not oriented opposite from each other, the image editing unit 302 proceeds to step S707.

In step S705, the image editing unit 302 determines whether or not the position of the window of the envelope is located at the center of the envelope. If the position of the window of the envelope is located at the center of the envelope, the image editing unit 302 proceeds to step S706. If the position of the window of the envelope is not located at the center of the envelope, the image editing unit 302 proceeds to step S707.

In step S706, the image combining unit 303 rotates the finished image of the to-be-inserted sheet by one hundred eighty degrees.

In step S707, the image editing unit 302 obtains the size of the window of the envelope and the position of the information to be presented within the window of the envelope from the postpress process information. Then, based on these pieces of information, the image editing unit 302 masks the region of the finished image 502 excluding the region corresponding to the window. In other words, the image editing unit 302 generates the to-be-combined image 503, whose window portion is not masked. Meanwhile, the image editing unit 302 generates the to-be-combined image 505 if the finished image has been rotated in step S706.

In step S708, the image combining unit 303 combines the to-be-combined image of the to-be-inserted sheet generated in step S707 and the envelope image obtained in step S701.

In step S709, the image combining unit 303 outputs the combined image generated in step S708 to a storage medium (RAM 202 or external memory 211). The combined image output in this step will be one of the reference images in the image verifying process to be described later.

Meanwhile, for the process illustrated in FIG. 7, the example has been described in which, if the front and rear sides of the envelope and the front and rear sides of the to-be-inserted sheet are oriented opposite from each other, the finished image 502 is rotated, and then the masking process is performed. However, the present invention is not limited to this example. The masking process may be performed first, and then the masked image may be rotated if the front and rear sides of the envelope and the front and rear sides of the to-be-inserted sheet are oriented opposite from each other.

Also, in this section, the process has been descried in which the finished image 502 is rotated if the position of the window of the envelope is located at the center of the envelope. This is because, in a case when the position of the window of the envelope is located at a position other than the center, the address will not be visible if the front and rear sides of the envelope and the front and rear sides of the to-be-inserted sheet are oriented opposite from each other, and will, therefore, not be checkable. However, a mode in which the process of step S705 is omitted may be employed. Specifically, to handle this rare case, the finished image 502 may be rotated and a process using that image may be performed if the front and rear sides of the envelope and the front and rear sides of the to-be-inserted sheet are oriented opposite from each other even in a case when the position of the window of the envelope is located at a position other than the center of the envelope.

<Flowchart of Image Verifying Process>

Figure 8:
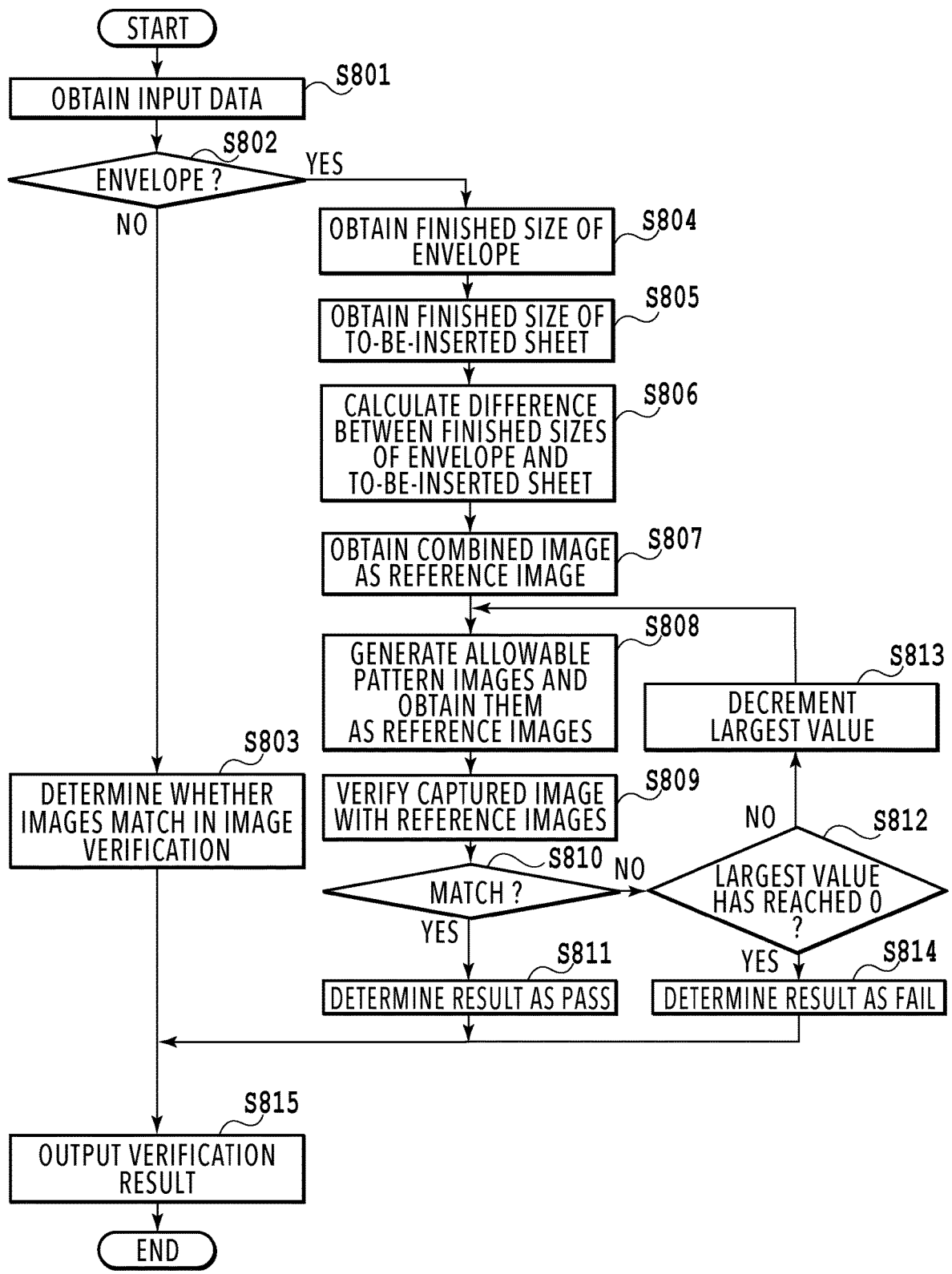
FIG. 8 is a flowchart of the image verifying process.

FIG. 8 is a flowchart of the image verifying process in this embodiment. The program for the procedure illustrated in FIG. 8 is stored in the ROM 203 of the information processing apparatus 104 or in the external memory 211, read into the RAM 202, and executed by the CPU 201.

In step S801, the verifying unit 306 obtains input data necessary for the image verification. Specifically, the verifying unit 306 obtains the combined image output by the image combining unit 303 and the captured image output by the captured image generating unit 305. The verifying unit 306 also obtains the order information.

In step S802, the verifying unit 306 analyzes the order information obtained in step S801 and determines whether the product type of the check target in the verifying process is an envelope. If the product type is not an envelope, the verifying unit 306 proceeds to step S803. If the product type is an envelope, the verifying unit 306 proceeds to step S804. Meanwhile, if the product type is not an envelope, the process is verification of, for example, a flyer, a business card, or the like.

In step S803, the verifying unit 306 performs image verification of the captured image with the images registered in advance to determine whether or not there is a proper match, and then proceeds to step S815.

In step S804, the verifying unit 306 obtains the finished size of the envelope from the order information obtained in step S801. In step S805, the verifying unit 306 obtains the finished size of the to-be-inserted sheet from the order information obtained in step S801.

In step S806, the verifying unit 306 subtracts the finished size of the to-be-inserted sheet obtained in step S805 from the finished size of the envelope obtained in step S804 to calculate the difference between the finished sizes. This finished size difference is the largest value of the amount of movement of the to-be-inserted sheet inside the envelope that can occur after the to-be-inserted sheet is inserted and sealed in the envelope.

In step S807, the verifying unit 306 obtains the combined image obtained in step S801 as a reference image. The reference image is an image to be used in the verification of the captured image in the verifying process.

In step S808, the verifying unit 306 generates allowable pattern images and obtains them as reference images. The verifying unit 306 obtains images before the image combination. Specifically, the verifying unit 306 obtains the envelope image 506 and the finished image 502 of the to-be-inserted sheet. Based on the finished size difference calculated in step S806, the verifying unit 306 shifts the finished image 502 relative to the envelope image 506 by the difference, or the largest value. Then, the verifying unit 306 masks the region of the shifted finished image 502 excluding the region corresponding to the window and combines the non-masked region with the envelope image 506 to thereby generate an allowable pattern image. In this embodiment, as illustrated by the allowable pattern images 601 to 604 in FIG. 6, the finished image 502 is moved by the value of the finished size difference in four, upward, downward, leftward, and rightward directions, and then subjected to the masking process and combined. However, the directions are not limited to the upward, downward, leftward, and rightward directions, but the finished image 502 may be moved in diagonal directions. Still alternatively, a plurality of tilt angles may be calculated from the largest value of the amount of movement in the top-bottom direction and the left-right direction, and the finished image 502 may be tilted at these tilt angles. For example, in a case when the largest value of the amount of movement is 5 mm toward the top and 5 mm toward the right, tilt angles may be calculated at 5-degree intervals from the top to the right within the range of (X-axis: 5 mm, Y-axis: 5 mm), the finished image 502 may be tilted at these angles, and then subjected to the masking process and combined.

In step S809, the verifying unit 306 verifies the captured image obtained in step S801 with the reference images. The reference images are the allowable pattern images obtained in step S808. Meanwhile, if it is the first time to perform this process of step S809, the reference images include the combined image obtained in step S807.

In step S810, the verifying unit 306 determines the result of the verification in step S809. If the captured image matches any of the reference images, the verifying unit 306 proceeds to step S811, in which it determines the verification result (check result) as a pass, and proceeds to step S815. On the other hand, if the captured image matches none of the reference images, the verifying unit 306 proceeds to step S812.

In step S812, the verifying unit 306 checks whether or not the value of the finished size difference is zero in each of the top-bottom direction and the left-right direction. In this embodiment, the verifying process is performed while sets of allowable patterns are sequentially generated by decrementing the amount of movement of the to-be-inserted sheet inside the envelope from the allowable patterns in which the amount of movement has the largest value. If the value of the finished size difference is zero, it indicates that there are no more allowable pattern images to be generated. Thus, if the value of the finished size difference is zero, the verifying unit 306 proceeds to step S814, in which it determines the verification result (check result) as a fail, and proceeds to step S815. On the other hand, if the value of the finished size difference is greater than zero, the verifying unit 306 proceeds to step S813.

In step S813, the verifying unit 306 decrements the value of the finished size difference in each of the top-bottom direction and the left-right direction to thereby update the value of the finished size difference. For example, a decrement amount specified in a setting file not illustrated may be used as the decrement amount (first amount) by which the value of the finished size difference is decremented, or the value of the finished size difference may be decremented by 1 mm. The verifying unit 306 then proceeds to step S808. Then, in step S808, the verifying unit 306 generates allowable pattern images based on the updated value of the finished size difference. The process described earlier is then repeated. Thus, the verifying unit 306 iterates steps S808 to S813 until the verification result indicates a match or the value of the finished size difference reaches zero.

In step S815, the verifying unit 306 outputs the result of the verifying process. The verification result may be output to the display 210 or output as a sound through a speaker, or the like (not illustrated). Meanwhile, if the result of the verifying process is a pass, the verifying unit 306 may output the result of the verifying process by outputting print data for printing a delivery slip to the image forming apparatus 105.

As described above, in this embodiment, the verifying process is performed with the postpress process taken into consideration. Hence, a proper shipping check can be performed. Moreover, even if the information to be visible through the window of the envelope is displaced during the envelope shipping check operation, the verification with a pre-registered image will not result in a misdetection. Consequently, a person in charge of the shipping check in a bundling operation can avoid the trouble of visually checking envelopes one by one that should be bundled together. Accordingly, the efficiency of the bundling operation can be improved.

<Modification>

Figure 9:
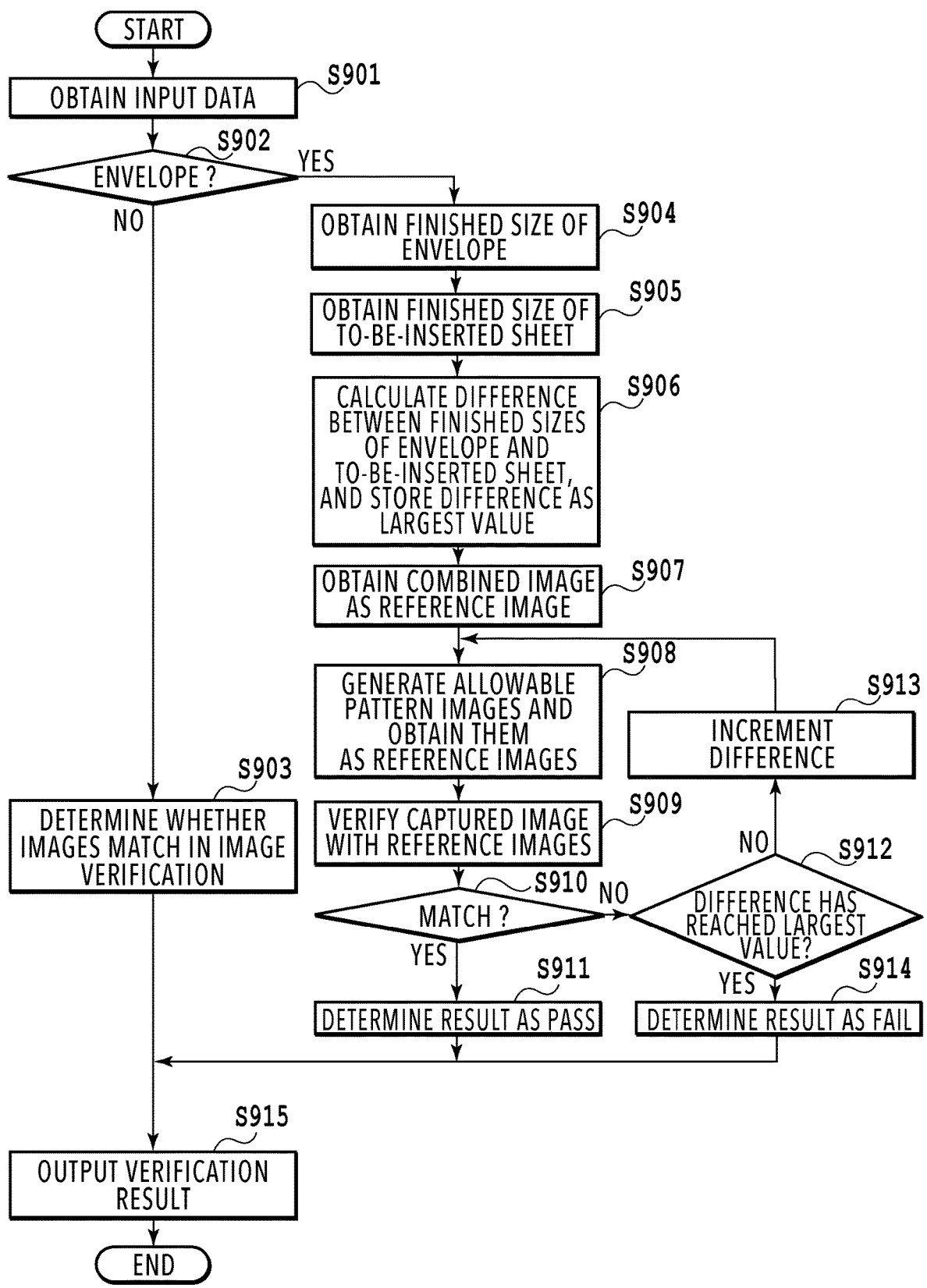
FIG. 9 is a flowchart of an image verifying process.

FIG. 9 is a chart illustrating a modification of the verifying process. For the example of FIG. 8, the description has been given of the mode in which the verifying process is performed while sets of allowable patterns are sequentially generated by decrementing the amount of movement of the to-be-inserted sheet inside the envelope from the allowable patterns in which the amount of movement has the largest value. In this modification, description will be given of a mode in which the verifying process is performed while sets of allowable patterns are sequentially generated by incrementing the amount of movement of the to-be-inserted sheet inside the envelope until obtaining the allowable patterns in which the amount of movement has the largest value.

In FIG. 9, the processes of steps S906, S912, and S913 differ from steps S806, S812, and S813 of the verifying process in FIG. 8, respectively. The other steps are similar to those in the verifying process in FIG. 8, and a description thereof will, therefore, be omitted.

In step S906, the verifying unit 306 calculates the finished size difference, as in step S806 in FIG. 8. In step S906, the verifying unit 306 stores this calculated finished size difference as the largest value. Then, the verifying unit 306 updates the finished size difference to a value larger than zero. For example, an increment amount specified in a setting file not illustrated may be used as the increment amount (second amount) by which the value of the finished size difference is incremented, or the value of the finished size difference may be incremented by 1 mm.

In step S912, the verifying unit 306 determines whether or not the difference has reached the largest value stored in step S906. If the difference has reached the largest value, it indicates that there are no more allowable pattern images to be generated. Thus, if the difference has reached the largest value stored in step S906, the verifying unit 306 proceeds to step S914, in which it determines the verification result (check result) as a fail. If the difference has not reached the largest value, the verifying unit 306 proceeds to step S913.

In step S913, the verifying unit 306 performs a process of incrementing the difference and proceeds to the process of step S908. The process described earlier is then repeated. Thus, the verifying unit 306 iterates steps S908 to S913 until the verification result indicates a match or the value of the finished size difference reaches the largest value.

In the situation where the to-be-inserted sheet is displaced inside the envelope, it is usually likely that the to-be-inserted sheet is not displaced by the largest value, but is slightly displaced relative to the combined image. For this reason, in a case when the verification is to be determined as passed, the process is expected to be faster by performing the verification process while sequentially generating sets of allowable patterns by incrementing the amount of movement of the to-be-inserted sheet inside the envelope until obtaining the allowable patterns in which the amount of movement has the largest value, as in the modification.

Other Embodiments

In the above embodiment, the mode has been exemplarily described in which the verifying unit 306 generates allowable pattern images based on the finished image of the to-be-inserted sheet and the envelope image. However, the present invention is not limited to this mode. The image combining unit 303 may generate the allowable patterns. Specifically, a mode may be employed in which the verifying unit 306 notifies the image combining unit 303 of the amount of displacement for the allowable pattern images to be generated and instructs the image combining unit 303 to generate the allowable pattern images, and the verifying unit 306 obtains the allowable pattern images generated by the image combining unit 303.

Also, in the above embodiment, the mode has been exemplarily described in which the allowable pattern images are generated based on the finished image of the to-be-inserted sheet and the envelope image. This is effective in a case when, as illustrated by, for example, the allowable pattern image 601 in FIG. 6, a characteristic portion (part of the black circle on the top left side) is visible through the window in a state where displacement has occurred. However, the allowable pattern images may be generated based on the to-be-combined image and the envelope image in a case when, even if displacement occurs, no characteristic portion is present in the region displayed in the displaced state. In other words, the allowable pattern images may be generated based on the image of the to-be-inserted sheet after the masking process and the envelope image.

Alternatively, the allowable pattern images may be generated based on an unedited to-be-inserted sheet image (e.g., a to-be-inserted sheet image 501), instead of the finished image of the to-be-inserted sheet, and on the postpress process information. Specifically, a mode may be employed in which the allowable pattern images are directly generated from the unedited to-be-inserted sheet image based on the difference for the displacement and the position of the information to be presented within the window of the envelope. In other words, a mode in which the allowable pattern images are generated without using the finished image 502 may be employed.

Also, in the above embodiment, the mode has been described in which sets of allowable pattern images are sequentially generated and, each time a set is generated, it is used in the verifying process. Such a process makes it possible to quickly obtain a verification result if the verification is to be determined as passed, and accordingly shortens the amount of time the user has to wait. However, the present invention is not limited to this mode. All generatable allowable pattern images may be generated in advance, and then the verification process may be performed with these images.

Also, in the above embodiment, the mode in which the to-be-inserted sheet is inserted into a windowed envelope has been exemplarily described. However, the present invention is not limited to this mode. The present invention is applicable to any mode as long as it is a mode involving performing processing including a process of inserting a second object into a first object configured such that an object inserted therein is at least partially visible. Specifically, the first object may not be limited to an envelope as long as the mode involves performing a verifying process based on a captured image obtained by capturing a first object with a second object inserted therein and on reference images of these objects.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
   at least one processor operatively coupled to a memory, serving as:
   (a) a generating unit configured to generate a reference image based on an image of a first object, an image of a second object, and processing information on processes including a process of inserting the second object into the first object, wherein the first object has at least one window portion through which the inserted second object is at least partially visible, wherein the generating unit (i) edits the image of the second object based on the processing information to generate an edited image including a region of a part of the second object that is to be visible in a state when the second object is inside the first object, and (ii) combines the edited image and the image of the first object to generate the reference image;
   (b) a verifying unit configured to verify a captured image with the generated reference image, the captured image being obtained by capturing the first object into which the second object has been inserted; and
   (c) an outputting unit configured to output a result of the verification.

2. The information processing apparatus according to claim 1, wherein the edited image is an image subjected to a masking process on a region excluding the region that is to be visible.

3. The information processing apparatus according to claim 1, wherein the processing information contains information on a position on a part of the second object that is to be visible in a state when the second object is inside the first object, and the generating unit generates the edited image based on the information on the position.

4. The information processing apparatus according to claim 1, wherein an image obtained by rotating the edited image by one hundred eighty degrees and the image of the first object are combined in a case when front and rear sides of the first object and front and rear sides of the second object, in a conveyance direction, in which the second object is to be inserted into the first object are oriented opposite from each other, and when the region, which is to be visible, is located at a center of the first object.

5. The information processing apparatus according to claim 1, wherein the captured image is an image obtained by capturing a surface of the first object into which the second object has been inserted.

6. The information processing apparatus according to claim 1, wherein the verifying unit performs the verification by comparing characters obtained by a character recognition process or geometrical features.

7. The information processing apparatus according to claim 1, wherein:
the first object is a windowed envelope having a window portion,
the second object is a to-be-inserted sheet, and
the processing includes folding of the to-be-inserted sheet.

8. The information processing apparatus according to claim 7, wherein the generating unit:
generates the edited image by performing a masking process on a region of the to-be-inserted sheet excluding a region thereof that is to be visible within the window of the envelope in a state when the to-be-inserted sheet is folded and inserted in the envelope, and
combines the edited image, generated by performing the masking process, and the image of the envelope to generate the reference image.

9. An information processing apparatus comprising:
at least one processor operatively coupled to a memory, serving as:
(a) a generating unit configured to generate a plurality of reference images based on an image of a first object, an image of a second object, and processing information on processes including a process of inserting the second object into the first object, wherein the first object has at least one window portion through which the inserted second object is at least partially visible;
(b) a verifying unit configured to verify a captured image with the plurality of reference images, the captured image being obtained by capturing the first object into which the second object has been inserted; and
(c) an outputting unit configured to output a result of the verification, wherein, if the captured image matches any of the plurality of reference images, the outputting unit outputs a result indicating that the verification is passed.

10. The information processing apparatus according to claim 9, wherein the processing information contains a size of the first object and a size of the second object in a processed state, and the plurality of reference images are generated by moving or tilting the image of the second object within a range of a difference obtained by subtracting the size of the second object in the processed state from the size of the first object.

11. The information processing apparatus according to claim 10, wherein the generating unit:
generates the plurality of reference images by moving or tilting the image of the second object by the difference, and
then, generates the plurality of reference images by moving or tilting the image of the second object by a second amount, and generates the plurality of reference images by decrementing the second amount until the second amount reaches zero, or the verification is passed.

12. The information processing apparatus according to claim 10, wherein the generating unit:
generates the plurality of reference images by moving or tilting the image of the second object by a first amount, and
generates the plurality of reference images by incrementing the first amount until the first amount reaches the difference, or the verification is passed.

13. The information processing apparatus according to claim 9, wherein:
the first object is a windowed envelope,
the second object is a to-be-inserted sheet,
the processing information contains information on processing of folding the to-be-inserted sheet and inserting the folded to-be-inserted sheet into the windowed envelope,
the generating unit generates a first reference image by editing an image of the to-be-inserted sheet based on the processing information and by combining the edited image of the to-be-inserted sheet and an image of the windowed envelope,
the generating unit further generates a second reference image by moving or tilting the edited image of the to-be-inserted sheet within a range of a difference obtained by subtracting a size of the folded to-be-inserted sheet from a size of the windowed envelope,
the verifying unit verifies the captured image with the first reference image and the second reference image, the captured image being obtained by capturing an image of the windowed envelope with the folded to-be-inserted sheet inserted therein, and
the generating unit generates a second reference image by updating an amount of the movement or the tilt within the range of the difference, until the verification by the verifying unit is passed.

14. A method of controlling an information processing apparatus, the method comprising:
generating a reference image based on an image of a first object, an image of a second object, and processing information on processes including a process of inserting the second object into the first object, wherein the first object has at least one window portion through which the inserted second object is at least partially visible, wherein the reference image is generated by (i) editing the image of the second object based on the processing information to obtain an edited image including a region of a part of the second object that is to be visible in a state when the second object is inside the first object, and (ii) combining the edited image and the image of the first object;
verifying a captured image with the generated reference image, the captured image being obtained by capturing the first object into which the second object is inserted; and
outputting a result of the verification.

15. The method of controlling an information processing apparatus according to claim 14, wherein:
  (a) the first object is a windowed envelope,
  (b) the second object is a to-be-inserted sheet,
  (c) the processing information contains information on processing of folding the to-be-inserted sheet and inserting the folded to-be-inserted sheet into the windowed envelope,
  (d) the generating a reference image includes:
    (i) editing an image of the to-be-inserted sheet based on the processing information,
    (ii) generating a first reference image by combining the edited image of the to-be-inserted sheet and an image of the windowed envelope, and
    (iii) generating a second reference image by moving or tilting the edited image of the to-be-inserted sheet within a range of a difference obtained by subtracting a size of the folded to-be-inserted sheet from a size of the windowed envelope,
  (e) the verifying a captured image includes verifying the captured image with the first reference image and the second reference image, the captured image being obtained by capturing an image of the windowed envelope with the folded to-be-inserted sheet inserted therein, and
  (f) the generating a reference image includes generating a second reference image by updating an amount of the movement or the tilt within the range of the difference, until the verification is passed.

16. A non-transitory computer readable storage medium storing a program that causes a computer to perform a control method, wherein the control method comprises:
  generating a reference image based on an image of a first object, an image of a second object and processing information on processes including a process of inserting the second object into the first object, wherein the first object has at least one window portion through which the inserted second object is at least partially visible, wherein the reference image is generated by (i) editing the image of the second object based on the processing information to obtain an edited image including a region of a part of the second object that is to be visible in a state when the second object is inside the first object, and (ii) combining the edited image and the image of the first object;
  verifying a captured image with the generated reference image, the captured image being obtained by capturing the first object into which the second object is inserted; and
  outputting a result of the verification.

17. The non-transitory computer readable storage medium according to claim 16, wherein:
  (a) the first object is a windowed envelope,
  (b) the second object is a to-be-inserted sheet,
  (c) the processing information contains information on processing of folding the to-be-inserted sheet and inserting the folded to-be-inserted sheet into the windowed envelope,
  (d) the generating a reference image includes:
    (i) editing an image of the to-be-inserted sheet based on the processing information,
    (ii) generating a first reference image by combining the edited image of the to-be-inserted sheet and an image of the windowed envelope, and
    (iii) generating a second reference image by moving or tilting the edited image of the to-be-inserted sheet within a range of a difference obtained by subtracting a size of the folded to-be-inserted sheet from a size of the windowed envelope,
  (e) the verifying a captured image includes verifying the captured image with the first reference image and the second reference image, the captured image being obtained by capturing an image of the windowed envelope with the folded to-be-inserted sheet inserted therein, and
  (f) the generating a reference image includes generating a second reference image by updating an amount of the movement or the tilt within the range of the difference, until the verification is passed.

* * * * *